(12) United States Patent
Hong et al.

(10) Patent No.: US 10,393,185 B2
(45) Date of Patent: Aug. 27, 2019

(54) BEARING FOR DRIVING MOTOR (71) Applicants: Hyundai Motor Company, Seoul (KR); Kia Motors Corporation, Seoul (KR)

(72) Inventors: Nyeonhan Hong, Gangwon-Do (KR); Hee Ra Lee, Gyeonggi-Do (KR); Jung Shik Kim, Seoul (KR); Kyungsoo Park, Daejeon (KR); Jae Bum Park, Gyeonggi-do (KR); Yong Jae Lee, Gyeonggi-Do (KR); Jai Hak Kim, Gyeonggi-do (KR); Suhyun Bae, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/041,452

(22) Filed: Jul. 20, 2018

(65) Prior Publication Data
US 2019/0178294 A1 Jun. 13, 2019

(30) Foreign Application Priority Data

Dec. 8, 2017 (KR) .......................... 10-2017-0168642

(51) Int. Cl.
*F16C 41/00* (2006.01)
*H02K 5/173* (2006.01)
*F16C 33/58* (2006.01)
*F16C 19/06* (2006.01)

(52) U.S. Cl.
CPC ............ *F16C 41/002* (2013.01); *F16C 33/58* (2013.01); *H02K 5/173* (2013.01); *F16C 19/06* (2013.01); *F16C 2202/32* (2013.01)

(58) Field of Classification Search
CPC .......................... F16C 41/002; F16C 2202/32
See application file for complete search history.

(56) References Cited

U.S. PATENT DOCUMENTS 9,175,728 B2 * 11/2015 White ................ F16C 33/7843
9,790,995 B2 * 10/2017 White .................... F16C 19/52
2017/0280540 A1 * 9/2017 Theis ....................... H05F 3/04

* cited by examiner

*Primary Examiner* — Thomas R Hannon
(74) *Attorney, Agent, or Firm* — Mintz Levin Cohn Ferris Glovsky and Popeo, P.C.; Peter F. Corless (57) ABSTRACT A bearing for a drive motor is provided. The bearing includes an inner race that is coupled to a rotation shaft, an outer race that is coupled to a motor housing, and rolling members that are rotatably disposed between a raceway surface of the inner race and a raceway surface of the outer race. Additionally, a retainer is disposed between the inner race and the outer race and supports the rolling members at a predetermined interval along a circumferential direction. A conductive guide member is formed in each of the inner race and the outer race and forms a current path between the inner race and the outer race through the retainer.

13 Claims, 8 Drawing Sheets

BEARING FOR DRIVING MOTOR

CROSS-REFERENCE TO RELATED APPLICATION

This application claims priority to and the benefit of Korean Patent Application No. 10-2017-0168642 filed on Dec. 8, 2017, the entire contents of which are incorporated herein by reference.

BACKGROUND

(a) Field of the Invention

The present invention relates to a drive motor for an electric power driven vehicle, and more particularly, to a bearing for a drive motor capable of suppressing erosion generation in the bearing due to a shaft current of the drive motor.

(b) Description of the Related Art

Recently, a pure electric powered eco-friendly vehicle such as an electric vehicle or a fuel cell vehicle has been developed. An electric motor is typically mounted within the electric powered eco-friendly vehicle as a drive source for obtaining a rotational force by electric energy instead of an internal combustion engine such as an engine. The drive motor includes a motor housing, a stator fixedly installed inside the motor housing, and a rotor that rotates around a rotation shaft that is a driving shaft. A gap is also maintained between the stator and the rotor.

The drive motor is required to have high efficiency and high output density. In particular, the electric vehicle needs to obtain the power of the vehicle from the drive motor, and therefore, a further improved torque and output are required. The drive motor is also required to be designed to be smaller in size and to exhibit high torque density and high output density, to generate a high level of torque and output within a limited vehicle space. Thus, the drive motor may be vulnerable to electromagnetic interference and leakage problems due to the generation of internally higher electromagnetic energy in the confined space.

One of the electromagnetic interference and leakage problems is a shaft current. When a three-phase inverter driving the drive motor performs high-speed switching control, a harmonic noise voltage (e.g., a common voltage) is generated. An electric field caused by the common voltage moves a free electron of the rotor steel plate to generate the shaft current in the rotation shaft. In other words, the harmonic noise voltage induces a voltage across the shaft of the rotor using a parasitic capacitor between the stator and the rotor to generate the shaft current.

The shaft current generated in the shaft of the rotor causes a potential difference between an inner race and an outer race of a bearing when the shaft current flows along the shaft or through the bearing to the motor housing, and a discharge mechanism inside the bearing causes the bearing erosion. The erosion substantially affects the durability of the drive motor and thus damages the bearing. Recently, a magnitude of the shaft current generated in the drive motor having high torque density and a high output density has increased.

The above information disclosed in this section is merely for enhancement of understanding of the background of the invention and therefore it may contain information that does not form the prior art that is already known in this country to a person of ordinary skill in the art.

SUMMARY

The present invention has been made in an effort to provide a bearing for a drive motor that is capable of suppressing an occurrence of electrolytic corrosion (e.g., erosion) in a rolling element and on a raceway surface by forming a current path of a shaft current generated in a rotation shaft when the drive motor is driven.

An exemplary embodiment of the present invention provides the bearing for the drive motor having an inner race coupled to a rotation shaft, an outer race coupled to a motor housing, and rolling members rotatably disposed between a raceway surface of the inner race and a raceway surface of the outer race. The bearing may include a retainer installed between the inner race and the outer race and configured to support the rolling members at a predetermined interval along a circumferential direction; and a conductive guide member that is included in the inner race and the outer race and forms a current path between the inner race and the outer race through the retainer.

The inner race, the outer race, the rolling members, and the retainer may be formed of a metal material. The retainer may be formed at a predetermined interval along the circumferential direction and may include a pocket member that supports the rolling members. The conductive guide member that corresponds to the pocket member may be formed in the inner race and the outer race along the circumferential direction. In other words, the conductive guide member is formed in each of the inner and outer races. The conductive guide member may include: a current carrying protrusion that protrudes in a radial direction, is disposed along the circumferential direction of the inner race and the outer race, and is disposed at a predetermined clearance with respect to the pocket member.

Further, the current carrying protrusion of the inner race may be integrally formed at a first side edge portion of the inner race at a predetermined clearance with respect to a first side of the pocket member. The current carrying protrusion of the outer race may be integrally formed at a second side edge portion of the outer race at a predetermined clearance with respect to a second side of the pocket member. A discharge phenomenon in which an electric spark occurs due to a shaft current in the rotation shaft may be generated in the current carrying protrusion and the pocket member. A clearance between the pocket member and the current carrying protrusion may be less than a clearance between the raceway surfaces of the inner race and the outer race and each of the rolling members. The retainer may be mounted on the inner race and the pocket member may be spaced apart from the outer race.

Another exemplary embodiment of the present invention provides the bearing for the drive motor having an inner race coupled to a rotation shaft, an outer race coupled to a motor housing, and rolling members disposed between a raceway surface of the inner race and a raceway surface of the outer race, a retainer installed between the inner race and the outer race and configured to support the rolling members at a predetermined interval along a circumferential direction; and a conductive guide member that is included in the inner race and the outer race and forms a current path between the inner race and the outer race through the retainer. The rolling members may be formed of a metal material, and an insulating member may be formed on the raceway surface of the inner race and the raceway surface of the outer race.

The inner race, the outer race, and the retainer may be formed of a metal material. The conductive guide member may include: a current carrying protrusion that protrudes in a radial direction and is disposed along the circumferential direction at a first side of the inner race at a predetermined clearance with respect to a first side of the pocket member or that protrudes in the radial direction and is disposed along the circumferential direction at a second side of the outer race at a predetermined clearance with respect to a second side of the pocket member.

Another exemplary embodiment of the present invention provides the bearing for the drive motor having an inner race coupled to a rotation shaft, an outer race coupled to a motor housing, and rolling members disposed between a raceway surface of the inner race and a raceway surface of the outer race. The bearing may include a retainer that is installed between the inner race and the outer race and supports the rolling members at a predetermined interval along a circumferential direction; and a conductive guide member that is included in the inner race and the outer race and forms a current path between the inner race and the outer race through the retainer. The rolling members may include an insulating material. The inner race, the outer race, and the retainer may be formed of a metal material, and the rolling members may be formed of a ceramic material.

The exemplary embodiment of the present invention may induce an electric spark through the retainer using a conductive guide member to suppress the erosion occurrence between rolling members and a race. Further, the effects which may be obtained or predicted by the exemplary embodiment of the present invention will be directly or implicitly disclosed in the detailed description of the exemplary embodiments of the present invention. That is, various effects which are predicted by the exemplary embodiments of the present invention will be disclosed in the detailed description to be described below.

BRIEF DESCRIPTION OF THE DRAWINGS

While the drawings are described in connection with what is presently considered to be practical exemplary embodiments, it is to be understood that the invention is not limited to the disclosed drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention.

Portions having no relation with the description will be omitted in order to explicitly explain the present invention, and the same reference numerals will be used for the same or similar elements throughout the specification. In the drawings, size and thickness of each element is approximately shown for better understanding and ease of description. Therefore, the present invention is not limited to the drawings, and the thicknesses of layers, films, panels, regions, etc., are exaggerated for clarity.

Further, in the following detailed description, names of constituents, which are in the same relationship, are divided into "the first", "the second", and the like, but the present invention is not limited to the order in the following description. In addition, the terminology such as " . . . unit", " . . . means", " . . . part", or " . . . member", which is disclosed in the specification, refers to a unit of an inclusive constituent which performs at least one of the functions or operations.

Figure 1:
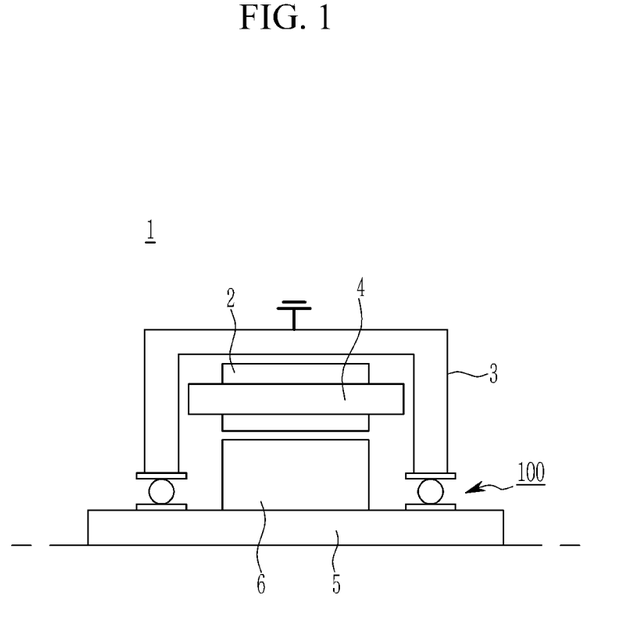
FIG. 1 is a view schematically showing an example of a drive motor to which a bearing according to an exemplary embodiment of the present invention is applied.

FIG. 1 is a view schematically showing an example of a drive motor to which a bearing according to an exemplary embodiment of the present invention is applied. Referring to FIG. 1, the drive motor 1 may be an electric power source of an environmentally friendly vehicle such as a pure electric vehicle or a fuel cell vehicle.

The drive motor 1 may be an electric power drive source of a hybrid vehicle (e.g., a hybrid electric vehicle (HEV) or a plug-in hybrid electric vehicle (PHEV)) that uses a driving force of an engine and an electric power. For example, the drive motor 1 may include a permanent magnet synchronous motor (PMSM) or a wound rotor synchronous motor (WRSM). However, it should be understood that the present invention is not limited to the drive motor of the environmentally friendly vehicle and a technical idea of the present invention may be applied to a drive motor used in various industrial fields.

The drive motor 1 may include a stator 2 fixed to an inside of a motor housing 3 and a rotor 6 configured to rotate around a rotation shaft 5 that is a driving shaft. A gap may be maintained between the stator and the rotor. For example, the drive motor 1 may be an inner rotor type synchronous motor in which the rotor 6 is disposed inside the stator 2. A stator coil 4 may be wound around the stator 2 and the rotation shaft 5 may be rotatably coupled to the motor housing 3 through the bearing 100.

The bearing 100 may be a ball bearing that supports the rotation shaft 5 using a rolling body (e.g., a rolling element) such as a ball. The bearing 100 may be slidably fitted into the rotation shaft 5 and may be fitted or installed to the motor housing 3 in a fitted manner. The bearing 100 for the drive motor may suppress an occurrence of electrolytic corrosion (e.g., erosion) in the rolling element and on a raceway surface by forming a current path (e.g., a current carrying path) of a shaft current generated in the rotation shaft when the drive motor is driven.

Figure 2:
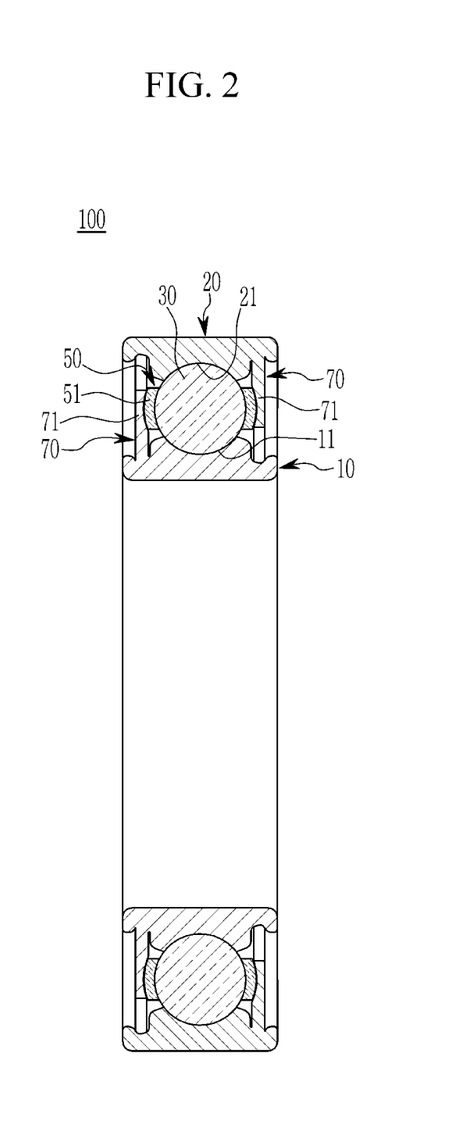
FIG. 2 and FIG. 3 are views showing a cutting face of the bearing for the drive motor according to an exemplary embodiment of the present invention.
Figure 3:
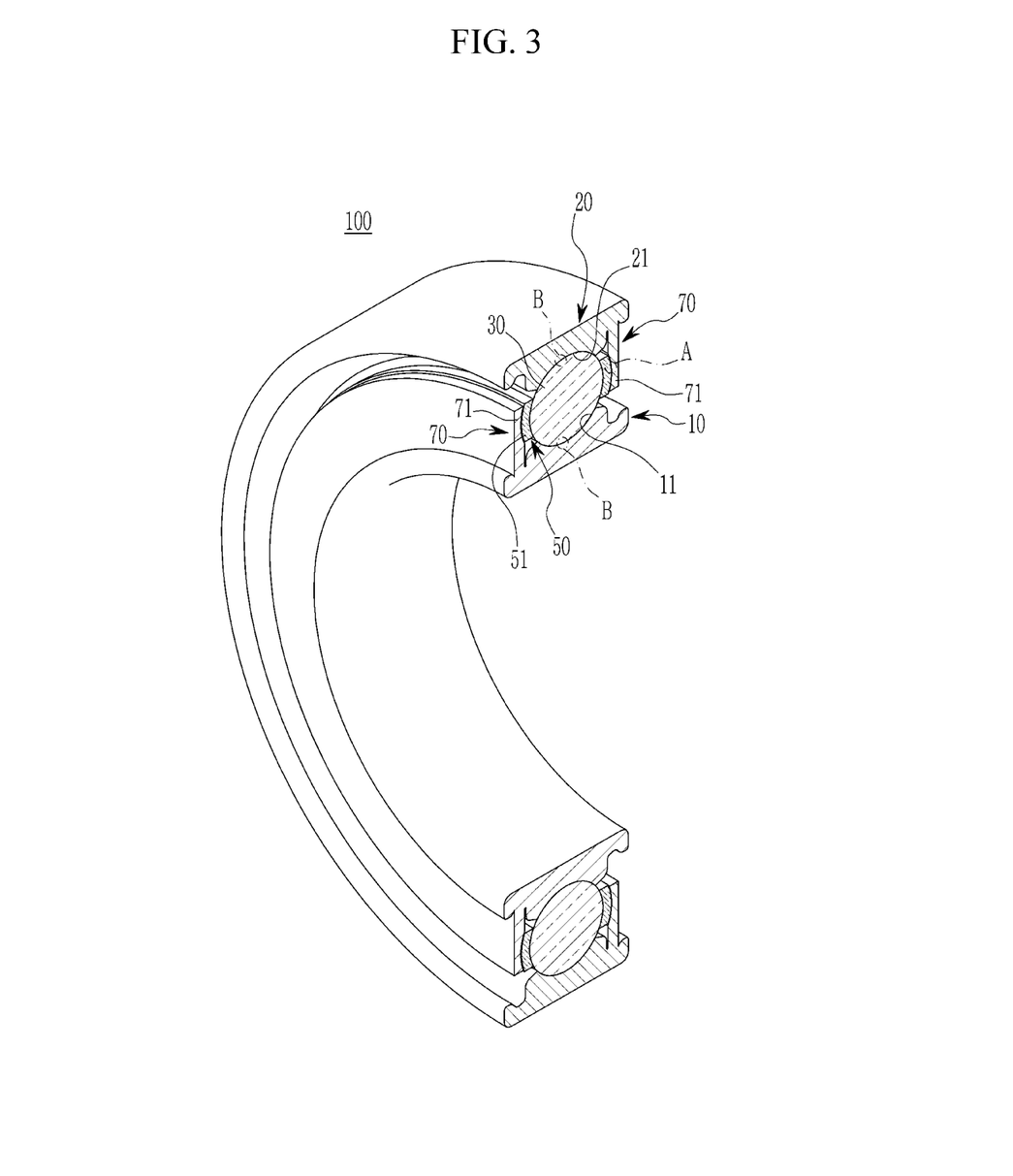
Figure 4:
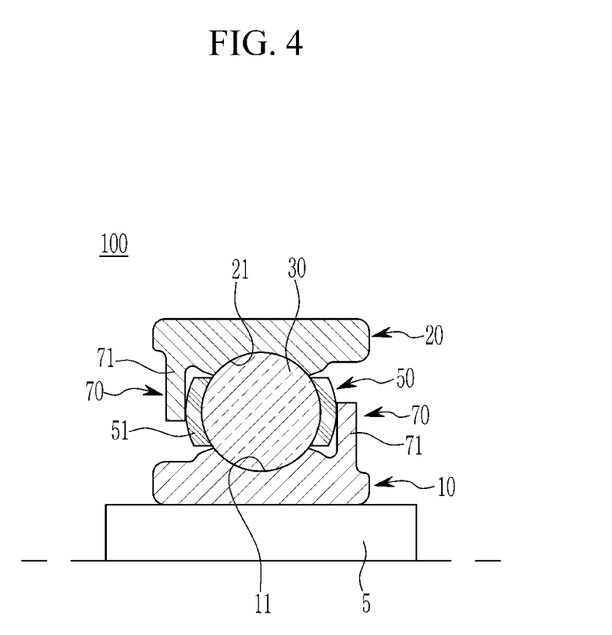
FIG. 4 is a view schematically showing a configuration of the bearing for the drive motor according to an exemplary embodiment of the present invention.

FIGS. 2 and 3 are views showing a cutting face of the bearing for the drive motor according to an exemplary embodiment of the present invention. FIG. 4 is a view schematically showing a configuration of the bearing for the drive motor according to an exemplary embodiment of the present invention. Referring to FIG. 2 to FIG. 4, the bearing 100 may include an inner race 10, an outer race 20, rolling members 30, a retainer 50, and a conductive guide member (e.g., a current carrying guide member) 70.

A circumferential direction of the inner race 10 and the outer race 20 is defined as a circumferential direction and a direction (e.g., a direction in which the rotation shaft 5 is coupled to the inner race 10 and the outer race 20 (or the inner race)) perpendicular to a plane on which the inner race 10 and the outer race 20 are disposed is defined as an axial direction (e.g., a shaft direction). A direction toward a thickness of the inner race 10, a thickness of the outer race 20, or an inner center of the bearing is defined as a radial direction.

Particularly, the inner race 10 may be formed into a ring shape or a cylinder shape, and may be installed on the rotating shaft 5 using a sliding interference fit. In the inner race 10, a race 11 that supports a rolling motion of the rolling members 30 may be formed along the circumferential direction. The race 11 is referred to as a raceway surface in a relevant field of technology. The outer race 20 may be spaced apart from the inner race 10 by a predetermined distance and may be fitted to a seating portion (e.g., an inner peripheral surface of a mounting aperture) of the motor housing 3. In the outer race 20, a race 21 that supports a rolling motion of the rolling members 30 may be formed along the circumferential direction.

The rolling members 30 may include a plurality of balls and may be rolling elements that roll between the races 11 and 21. The inner race 10, the outer race 20, and the rolling members 30 may be made of a metal material having conductivity. For example, the metal material may include Bearing steel (KS: STB2, JS: SUJ2, ISO: 100Cr6) or a high-carbon low-chromium steel. The retainer 50 may be disposed between the inner race 10 and the outer race 20, may support the rolling members 30 at a predetermined interval along the circumferential direction, and is referred to as a cage in the relevant field of technology.

Further, the retainer 50 may be made of a metal material having conductivity and may include a ring-shaped body member (not shown) mounted on the inner race 10 and disposed between the inner race 10 and the outer race 20. The retainer or the ring-shaped body member may be formed at a predetermined interval along the circumferential direction. A pocket member 51 may maintain a consistent gap between the rolling members 30 and may support the rolling members 30.

The pocket member 51 may be referred to as a bulkhead in the relevant field of technology and may include a pocket wall that is open in the radial direction and is disposed between the inner race 10 and the outer race 20. The pocket member 51 may prevent the rolling members 30 from being displaced in the axial direction and may be spaced apart from the outer race 20 or the inner race 10 by a predetermined distance. The conductive guide member 70 may be configured to discharge the shaft current generated in the rotation shaft 5 as an electric spark through the inner race 10, the retainer 50 and the outer race 20. In other words, the conductive guide member 70 may induce a discharge phenomenon in which the electric spark occurs among the inner race 10, the retainer 50, and the outer race 20 due to the shaft current flowing along the rotation shaft 5.

The conductive guide member 70 may form a current carrying path that may be disposed between the inner race 10 and the outer race 20 through the retainer 50. The conductive guide member 70 that corresponds to the pocket member 51 of the retainer 50 may be formed in the inner race 10 and the outer race 20 along the circumferential direction. The conductive guide member 70 may include a current carrying protrusion 71 that protrudes in the radial direction, is disposed along the circumferential direction of the inner race 10 and the outer race 20, and is disposed at a predetermined clearance (e.g., a predetermined gap) with respect to the pocket member 51 of the retainer 50.

In addition, the current carrying protrusion 71 in the inner race 10 may be integrally formed at a first side edge portion of the inner race 10 at a predetermined clearance with respect to a first side of the pocket member 51, may protrude in the radial direction, and may be disposed along the circumferential direction of the inner race 10. The current carrying protrusion 71 in the outer race 20 may be integrally formed at a second side edge portion of the outer race 20 at a predetermined clearance with respect to a second side of the pocket member 51, may protrude in the radial direction, and may be disposed along the circumferential direction of the outer race 20. The current carrying protrusion 71 in the inner race 10 may be formed to protrude outward of the radial direction, and the current carrying protrusion 71 in the outer race 20 may be formed to protrude inward of the radial direction.

Figure 5:
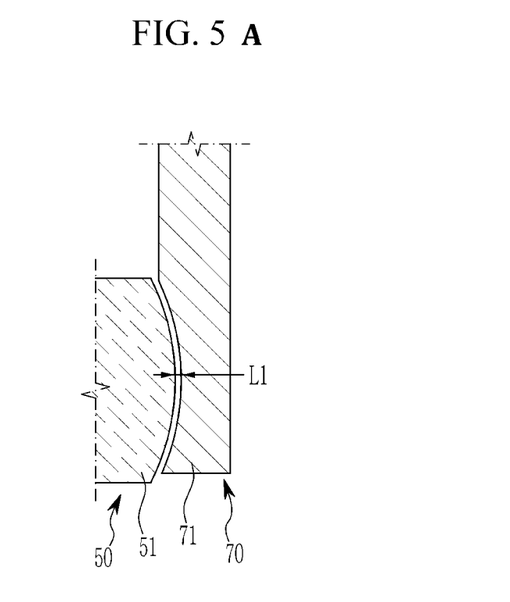
FIGS. 5A-5B are detailed views of portions A and B of FIG. 3, respectively according to an exemplary embodiment of the present invention.

As shown in FIGS. 5A and 5B, a clearance L1 set by an oil film may be disposed between the pocket member 51 and the current carrying protrusion 71. The clearance L1 may be set less than a clearance L2 between the race 11 or 21 and the rolling member 30. Since the clearance L1 may be set less than the clearance L2, the shaft current generated in the rotation shaft 5 may be discharged. The discharge of the shaft current at the current carrying protrusion 71 and the pocket member 51 as described above will be described in more detail later.

Figure 6:
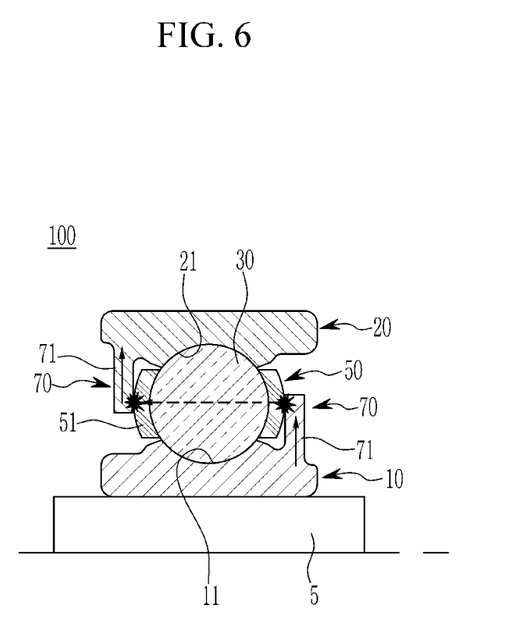
FIG. 6 is a view illustrating an operation of the bearing for the drive motor according to an exemplary embodiment of the present invention.

Hereinafter, an operation of the bearing 100 will be described in detail with reference to the accompanying drawings. FIG. 6 is a view illustrating the operation of the bearing for the drive motor according to an exemplary embodiment of the present invention. Referring to FIGS. 1 and 6, when an inverter performs high-speed switching control to operate the drive motor 1, a harmonic noise voltage may be generated.

The harmonic noise voltage may induce a voltage across the rotation shaft 5 of the rotor 6 using a parasitic capacitor between the stator 2 and the rotor 6 to generate the shaft current in the rotation shaft 5. The shaft current may flow to the inner race 10. Since the current carrying protrusion 71 may be formed in the inner race 10 and the outer race 20 at a predetermined clearance with respect to the pocket member 51 of the retainer 50, the current carrying path having a discharge form that is disposed between the inner race 10 and the outer race 20 may be formed through the current carrying protrusion 71 and the pocket member 51. That is, the current carrying path may be formed as a discharge path. Thus, the discharge phenomenon in which the electric spark occurs due to the shaft current may be generated in the current carrying protrusion 71 and the pocket member 51.

In particular, the clearance L1 may be set less than the clearance L2. Since there is a difference in the clearances L1 and L2, a substantial electrical resistance may be generated between the race 11 or 21 and the rolling member 30, and a minimal electrical resistance may be generated between the current carrying protrusion 71 and the pocket member 51. Therefore, the shaft current may flow to a path between the current carrying protrusion 71 and the pocket member 51 that has a minimal resistance to generate the discharge phenomenon between the current carrying protrusion 71 and the pocket member 51.

Thus, the erosion due to the discharge phenomenon may be generated in the pocket member 51. However, the erosion of the pocket member 51 has no effect on the rolling member 30 that rolls between the races 11 and 21. Therefore, since a current flows between the current carrying protrusion 71 and the pocket member 51 in the exemplary embodiment of the present invention, the discharge phenomenon in which occurs between the rolling members 30 and the races 11 and 21 may be minimized. As a result, the erosion between the rolling members 30 and the races 11 and 21 due to the discharge phenomenon may be prevented. Accordingly, damage to the rolling members 30 and the races 11 and 21 due to the erosion may be prevented.

Figure 7:
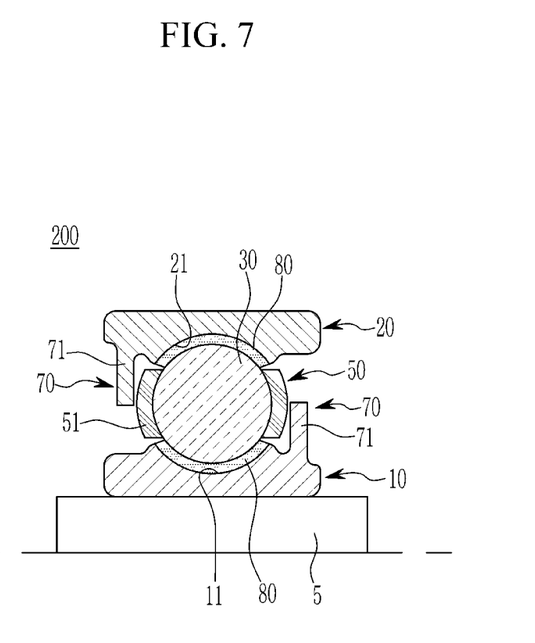
FIG. 7 is a view schematically showing a configuration of the bearing for the drive motor according to another exemplary embodiment of the present invention.

FIG. 7 is a view schematically showing a configuration of the bearing for the drive motor according to another exemplary embodiment of the present invention. In FIG. 7, the same reference numerals as those in the above exemplary embodiment are given to the same elements as the elements of the exemplary embodiment. Referring to FIG. 7, the bearing 200 for the drive motor according to another exemplary embodiment of the present invention may include the elements of the above exemplary embodiment and an insulating member 80 disposed in the races 11 and 21 of the inner race 10 and the outer race 20.

In another exemplary embodiment of the present invention, the retainer 50 disposed between the inner race 10 and the outer race 20, the pocket member 51 of the retainer 50, and the current carrying protrusion 71 of conductive guide member 70 are the same as those in the above exemplary embodiment. Thus, a detailed description thereof will be omitted. The insulating member 80 may be made of a known insulating material and may be coated or attached to the races 11 and 21 of the inner race 10 and the outer race 20, respectively. The rolling members 30 disposed between the inner and outer races 10 and 20, the retainer 50, and the inner and outer races 10 and 20 may be made of a metal material.

Therefore, in the exemplary embodiment of the present invention, the insulating member 80 may be formed on the races 11 and 21 of the inner and outer races 10 and 20 supporting a rolling motion of the rolling members 30. Thus, an electrical resistance generated between the races 11 and 21 and the rolling member 30 may be set to be greater than an electric resistance generated between the current carrying protrusion 71 and the pocket member 51. Thus, in the exemplary embodiment of the present invention, the shaft current generated in the rotation shaft 5 may flow to a path disposed between the current carrying protrusion 71 and the pocket member 51 and has a minimal electrical resistance. The current carrying protrusion 71 and the pocket member 51 may cause the discharge phenomenon in which the electric spark occurs. Accordingly, in the exemplary embodiment of the present invention, the discharge phenomenon generated between the race 11 or 21 and the rolling member 30 may be prevented.

Figure 8:
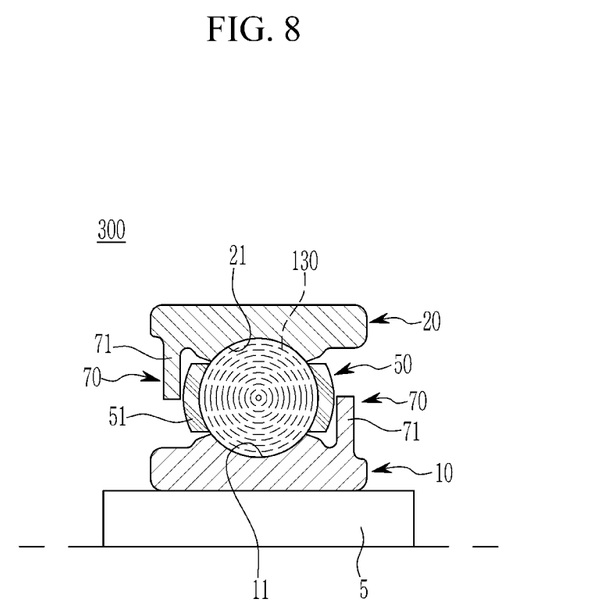
FIG. 8 is a view schematically showing a configuration of the bearing for the drive motor according to another exemplary embodiment of the present invention.

Another structure and another operation of the bearing 200 for the drive motor according to another exemplary embodiment of the present invention are the same as those in the above exemplary embodiment, and thus a detailed description thereof will be omitted. FIG. 8 is a view schematically showing a configuration of the bearing for the drive motor according to another exemplary embodiment of the present invention. In FIG. 8, the same reference numerals as those in the above exemplary embodiment are given to the same elements as the elements of the exemplary embodiment. Referring to FIG. 8, the bearing 300 for the drive motor according to another exemplary embodiment of the present invention may include the elements of the above exemplary embodiment and rolling members 130 made of an insulating material.

In another exemplary embodiment of the present invention, the retainer 50 included between the inner race 10 and the outer race 20, the pocket member 51 of the retainer 50, and the current carrying protrusion 71 of conductive guide member 70 are the same as those in the above exemplary embodiment. Thus, a detailed description thereof will be omitted. The rolling member 130 may be disposed between the races 11 and 21 of the inner and outer races 10 and 20. For example, the rolling member 130 may include a ball made of a ceramic material that is a known insulating material. The retainer 50 and the inner and outer races 10 and 20 may be made of a metal material.

Therefore, in the exemplary embodiment of the present invention, the rolling members 130 between the inner and outer races 10 and 20 may be made of the insulating material. Thus, an electrical resistance between the races 11 and 21 and the rolling member 130 may be set to be greater than an electric resistance between the current carrying protrusion 71 and the pocket member 51. Accordingly, in the exemplary embodiment of the present invention, the shaft current generated in the rotation shaft 5 may flow to a path disposed between the current carrying protrusion 71 and the pocket member 51 and has a minimal electrical resistance. The current carrying protrusion 71 and the pocket member 51 may cause the discharge phenomenon in which the electric spark occurs.

In the exemplary embodiment of the present invention, the current carrying path that has the discharge form and includes the inner race 10, the retainer 50, and the outer race 20 may be formed by the current carrying protrusion 71. Thus, referring to FIG. 1, the shaft current generated in the rotation shaft 5 may flow to the grounded motor housing 3. Therefore, the exemplary embodiment of the present invention may prevent electric shock of an operator due to a shaft voltage stored in the rotation shaft 5 when the drive motor 1 or the bearing are replaced or repaired.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

1: drive motor
2: stator
3: motor housing
4: stator coil
5: rotation shaft
6: rotor
10: inner race
11, 21: race
20: outer race
30, 130: rolling member
50: retainer
51: pocket member
70: conductive guide member
71: current carrying protrusion
80: insulating member
L1, L2: clearance
100, 200, 300: bearing

What is claimed is:

1. A bearing for a drive motor having an inner race coupled to a rotation shaft, an outer race coupled to a motor housing, and rolling members rotatably disposed between a raceway surface of the inner race and a raceway surface of the outer race, comprising:
a retainer disposed between the inner race and the outer race and configured to support the rolling members at a predetermined interval along a circumferential direction thereof; and
a conductive guide member formed in each of the inner race and the outer race and that forms a current path between the inner race and the outer race through the retainer,
wherein the retainer is formed at a predetermined interval along the circumferential direction and includes a pocket member that supports the rolling members, and wherein the conductive guide member corresponding to the pocket member is formed in the inner race and the outer race along the circumferential direction thereof,
wherein the conductive guide member includes a current carrying protrusion that protrudes in a radial direction, is disposed along the circumferential direction of the inner race and the outer race, and is disposed at a predetermined clearance with respect to the pocket member,
wherein the current carrying protrusion of the inner race is integrally formed at a first side edge portion of the inner race at a predetermined clearance with respect to a first side of the pocket member, and wherein the current carrying protrusion of the outer race is integrally formed at a second side edge portion of the outer race at a predetermined clearance with respect to a second side of the pocket member, and
wherein a discharge phenomenon in which an electric spark occurs due to a shaft current in the rotation shaft is generated in the current carrying protrusion and the pocket member.

2. The bearing of claim 1, wherein the inner race, the outer race, the rolling members, and the retainer are formed of a metal material.

3. The bearing of claim 1, wherein a clearance between the pocket member and the current carrying protrusion is less than a clearance between the raceway surfaces of the inner race and the outer race and each of the rolling members.

4. The bearing of claim 1, wherein the retainer is mounted on the inner race, and wherein the pocket member is spaced apart from the outer race.

5. A bearing for a drive motor having an inner race coupled to a rotation shaft, an outer race coupled to a motor housing, and rolling members disposed between a raceway surface of the inner race and a raceway surface of the outer race, comprising:
a retainer disposed between the inner race and the outer race and configured to support the rolling members at a predetermined interval along a circumferential direction thereof; and
a conductive guide member formed in each of the inner race and the outer race and that forms a current path between the inner race and the outer race through the retainer,
wherein the rolling members are formed of a metal material, and an insulating member is formed on the raceway surface of the inner race and the raceway surface of the outer race.

6. The bearing of claim 5, wherein the inner race, the outer race, and the retainer are formed of a metal material, wherein the retainer is formed at a predetermined interval along the circumferential direction and includes a pocket member that supports the rolling members, and wherein the conductive guide member corresponding to the pocket member is formed in the inner race and the outer race along the circumferential direction thereof.

7. The bearing of claim 6, wherein the conductive guide member includes:
a current carrying protrusion that protrudes in a radial direction and is disposed along the circumferential direction at a first side of the inner race at a predetermined clearance with respect to a first side of the pocket member or that protrudes in the radial direction and is disposed along the circumferential direction at a second side of the outer race at a predetermined clearance with respect to a second side of the pocket member.

8. The bearing of claim 5, wherein a discharge phenomenon in which an electric spark occurs due to a shaft current in the rotation shaft is generated in the current carrying protrusion and the pocket member.

9. A bearing for a drive motor having an inner race coupled to a rotation shaft, an outer race coupled to a motor housing, and rolling members disposed between a raceway surface of the inner race and a raceway surface of the outer race, comprising:
a retainer disposed between the inner race and the outer race and configured to support the rolling members at a predetermined interval along a circumferential direction thereof; and
a conductive guide member formed in each of the inner race and the outer race and that forms a current path between the inner race and the outer race through the retainer,
wherein the rolling members include an insulating material.

10. The bearing of claim 9, wherein the inner race, the outer race, and the retainer are formed of a metal material, wherein the retainer is formed at a predetermined interval along the circumferential direction and includes a pocket member that supports the rolling members, and wherein the conductive guide member corresponding to the pocket member is formed in the inner race and the outer race along the circumferential direction thereof.

11. The bearing of claim 10, wherein the conductive guide member includes:
a current carrying protrusion that protrudes in a radial direction and is disposed along the circumferential direction at a first side of the inner race at a predetermined clearance with respect to a first side of the pocket member or that protrudes in the radial direction and is disposed along the circumferential direction at a second side of the outer race at a predetermined clearance with respect to a second side of the pocket member.

12. The bearing of claim 9, wherein the rolling members are formed of a ceramic material.

13. The bearing of claim 9, wherein a discharge phenomenon in which an electric spark occurs due to a shaft current in the rotation shaft is generated in the current carrying protrusion and the pocket member.

* * * * *